Oct. 7, 1952 M. CAMRAS 2,612,681
METHOD OF MAKING MAGNETIC RECORDING HEADS
Original Filed Nov. 29, 1945
Fig. 1.
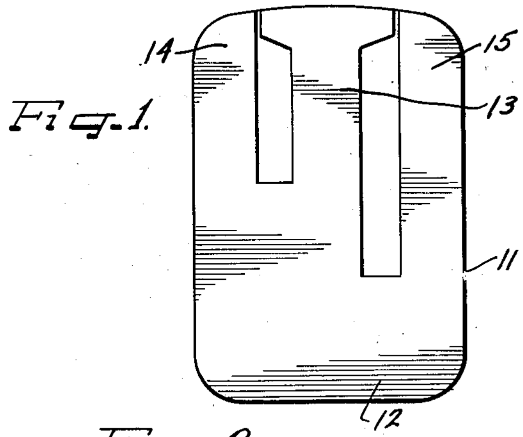
Fig. 2.
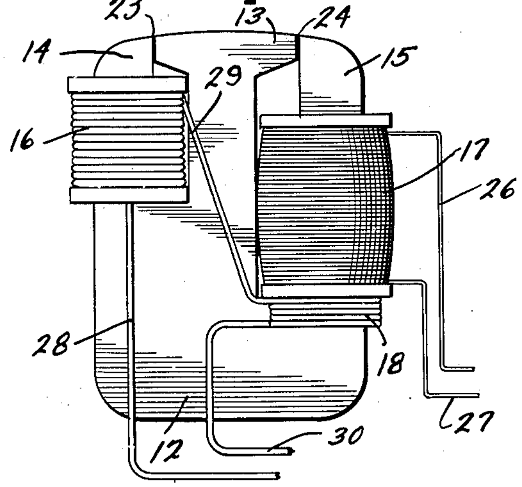
Fig. 3.
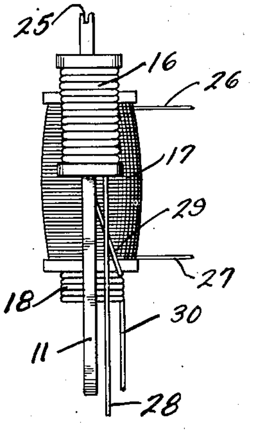
Fig. 4. Fig. 5. Fig. 6. Fig. 7.
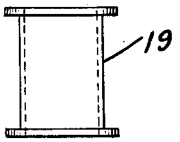
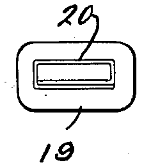
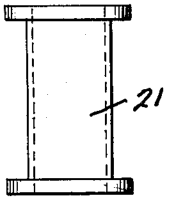
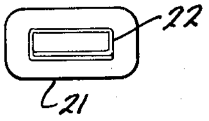
Inventor
MARVIN CAMRAS
by [signature] Attys.

Patented Oct. 7, 1952 2,612,681

UNITED STATES PATENT OFFICE 2,612,681

METHOD OF MAKING MAGNETIC RECORDING HEADS

Marvin Camras, Chicago, Ill., assignor to Armour Research Foundation of Illinois Institute of Technology, Chicago, Ill., a corporation of Illinois Original application November 29, 1945, Serial No. 631,682, now Patent No. 2,456,767, dated December 21, 1948. Divided and this application February 17, 1947, Serial No. 729,100

1 Claim. (Cl. 29—155.58)

This invention relates to a magnetic recording and reproducing head and to a method of making the same, and more particularly, to an electro-magnetic transducer head which is especially suited for use with a wire or other elongated recording medium which is longitudinally magnetized.

This application is a division of my copending application for patent entitled "Magnetic Recording and Reproducing Head," U. S. Serial No. 631,682, filed November 29, 1945, issued now as Patent No. 2,456,767, and assigned to the same assignee as the present invention.

In magnetic recording and reproducing devices, it has been found very desirable to have a head in which a single core piece comprises the core for the erasing coil, for the signal coil, and for the coil which supplies the high frequency component to the non-magnetic gap associated with the signal coil during the recording operation.

It has also been found desirable that such an electro-magnetic transducer head should be of the so-called "open slot" type whereby an elongated record medium does not have to be threaded through any of the coils. When magnetic material having a relatively high coercive force is used for the elongated record medium, considerable difficulty has been experienced in the past in properly and adequately erasing the previous history on the record medium. Difficulty has also been experienced during reproduction where a common core structure is used for both the erasing coil and for the signal coil, since the stray flux created in the core by the record medium crossing the erase gap sets up an out of phase flux which threads the signal coil. This out of phase flux represents distortion of the voltage induced in the signal coil.

One of the principal features and objects of the present invention is to provide a novel method for making an electro-magnetic transducer head which overcomes the difficulties previously experienced.

A further object of the present invention is to provide an extremely economical method of manufacturing electro-magnetic transducer heads of high quality.

Another and further object of the present invention is to provide a novel metal working process.

Still a further object of the present invention is to provide a novel core structure for an electro-magnetic transducer head and to a novel method of assembling coils thereon.

The novel features which I believe to be characteristic of my invention are set forth in particularity in the appended claim. My invention itself, however, both as to its organization and method of making together with further objects and advantages thereof may best be understood by reference to the following description taken in conjunction with the accompanying drawing, in which:

Figure 1 is an elevational view of the core member of an electro-magnetic transducer head embodying the novel teachings and principles of the present invention;

Figure 2 is an elevational view of the core shown in Figure 1 with the erase coil, signal coil and high frequency coil mounted thereon;

Figure 3 is an end view of the assembly shown in Figure 2;

Figure 4 is an elevational view of the erase coil spool;

Figure 5 is a top view of the erase coil spool;

Figure 6 is an elevational view of the signal coil spool; and

Figure 7 is a top view of the signal coil spool.

Referring first to Figure 1 of the drawing, there is illustrated therein a core 11 for an electro-magnetic transducer head. This core 11 is in the form of a flat plate or stamping having a base portion 12, a central T-shaped leg 13 and two outer legs 14 and 15. The leg 15 is somewhat longer than the leg 14 in order that it may accommodate a signal coil 17 as well as a high frequency coil 18 while the leg 14 only accommodates an erase coil 16. The core 11 may be formed of any suitable magnetic core material having a relatively high initial permeability, relatively low coercive force and having a saturation level somewhat higher than the record medium with which the head is to be used. By way of example, and not by way of limitation, this core piece may be approximately .20 inch thick and approximately three-quarters of an inch high.

In Figure 2 of the drawing, the erase coil 16, the signal coil 17 and the high frequency coil 18 are shown mounted on the core. The erase coil 16 is mounted on the leg 14 while the signal coil 17 and the high frequency coil 18 are mounted on the leg 15. While the high frequency coil is shown as being disposed below the signal coil 17, its relative position on the leg 15 may be reversed if desired.

The erase coil 16 may be conveniently wound on a spool 19 such as shown in Figures 4 and 5 of the drawing, the spool 19 having a central opening 20 to enable it to be slipped over the leg 14 in a manner presently to be described. Similarly, the signal coil may be conveniently wound on a spool 21 as may be seen in Figures 6 and 7 of the drawing, the spool 21 having a central opening 22 to enable it to be slipped over the leg 15.

The above referred to structure enables a very eocnomical production of the electro-magnetic transducer head since the erase coil 16 and the signal coil 17 may be wound in advance on their respective spools 19 and 21 on any bobbin or spool winding machine. To assemble the coils on the core 11, the legs 14 and 15 are bent out of the plane of the leg 13 sufficient to enable the spools 19 and 21 to be slipped over their respective legs. The legs 14 and 15 are then bent back into position so that they lie in the same planes as the central leg 13 and the gaps are checked and adjusted with a thickness gauge. At this time, a drop of solder or other non-magnetic binder is preferably dropped into the gaps 23 and 24. The solder dropped into the gaps 23 and 24 not only serves to hold the legs in a position where their gaps are fixed and determined, but also serves to keep dust and other foreign particles out of the gaps.

The upper edges of the legs 14, 13 and 15 are slotted lengthwise of the edge as at 25 to receive a wire or thread-like record medium.

The high frequency coil 18 is formed by simply winding a few turns of the lead wire to the erase coil 16 around the leg 15 in such a direction as to oppose the stray flux from the erase gap. This is preferably done before the signal coil 17 has been dropped into place.

The signal coil 17 has its opposite ends connected through conductors 26 and 27 to the main circuit of the magnetic recorder and reproducer (not shown).

The lower end of the erase coil 16 is connected through a conductor 28 to one side of a suitable source of high frequency electric energy. The other side of the erase coil 16 has a conductor 29 which is the end of the coil 16 which leads over the leg 15 and is wrapped therearound to form the high frequency coil 18. From there it extends as a conductor 30 to the other side of the source of high frequency electric energy. This high frequency electric energy may have a frequency which varies through wide limits without departing from the spirit and scope of the present invention. By way of example, and not by way of limitation, the frequency of this source may be of the general order of magnitude of twenty to fifty kilocycles per second.

While I have shown and described a particular embodiment of my invention, it will, of course, be understood that I do not wish to be limited thereto, since many modifications may be made, and I therefore contemplate by the appended claim to cover all such modifications as fall within the true spirit and scope of my invention.

I claim as my invention:

The method of making an electro-magnetic transducer head for transducing signal energy between a traveling magnetic record medium and an electric circuit comprising the steps of stamping from paramagnetic sheet material three parallel straight legs integrally joined at one of their ends and free at their other ends with a T-shaped retaining head on the free end of the center leg, bending the free ends of the outer legs out of the plane of the center leg to separate the free ends of the legs at least a distance equal to the original parallel spacing of the legs contemporaneously slipping a tightly fitting preformed coil on each of the outer legs, and bending the outer legs back to the plane of the center leg to a predetermined spacing from the T-shaped head to retain each coil snugly on its respective leg.

MARVIN CAMRAS.

REFERENCES CITED

The following references are of record in the file of this patent:

UNITED STATES PATENTS

| Number | Name | Date |
|---|---|---|
| 434,164 | Terry | Aug. 12, 1890 |
| 1,401,493 | Replogle | Dec. 27, 1921 |
| 1,585,158 | Livingston | May 18, 1926 |
| 1,801,214 | Von Henke | Apr. 14, 1931 |
| 1,919,995 | Wry | July 25, 1933 |
| 2,230,913 | Schuller | Feb. 4, 1941 |
| 2,350,029 | Glass, Jr. | May 30, 1944 |
| 2,351,003 | Camras | June 13, 1944 |
| 2,361,752 | Eilenberger | Oct. 31, 1944 |
| 2,456,767 | Camras | Dec. 21, 1948 |

FOREIGN PATENTS

| Number | Country | Date |
|---|---|---|
| 7,856 | Great Britain | May 10, 1889 |